(12) United States Patent
Li et al.

(10) Patent No.: US 8,836,310 B2
(45) Date of Patent: Sep. 16, 2014

(54) SWITCH-MODE POWER SUPPLY CONTROLLER AND ASSOCIATED METHOD

(75) Inventors: Yike Li, Chengdu (CN); Xiangyong Xu, Hangzhou (CN)

(73) Assignee: Chengdu Monolithic Power Systems, Co., Ltd., Chengdu (CN)

( * ) Notice: Subject to any disclaimer, the term of this patent is extended or adjusted under 35 U.S.C. 154(b) by 124 days.

(21) Appl. No.: 13/457,857

(22) Filed: Apr. 27, 2012

(65) Prior Publication Data

US 2012/0275199 A1 Nov. 1, 2012

(30) Foreign Application Priority Data

Apr. 29, 2011 (CN) .......................... 2011 1 0115892

(51) Int. Cl.
*H02M 3/156* (2006.01)
*H02M 3/335* (2006.01)

(52) U.S. Cl.
CPC .................................. *H02M 3/33507* (2013.01)
USPC ...... 323/285; 323/288; 363/21.15; 363/21.16

(58) Field of Classification Search
CPC ................ H02M 3/156; H02M 3/157; H02M 2001/0009; H02M 2001/0025; H02M 1/44
USPC ............ 323/282–285, 288; 363/21.12, 21.15, 363/21.16, 21.17
See application file for complete search history.

(56) References Cited

U.S. PATENT DOCUMENTS

| | | | | |
|---|---|---|---|---|
| 5,264,780 A * | 11/1993 | Bruer et al. | .................... | 323/222 |
| 7,026,851 B2 * | 4/2006 | Yang et al. | .................... | 327/172 |
| 7,701,305 B2 * | 4/2010 | Lin et al. | ........................ | 331/143 |
| 8,289,733 B2 * | 10/2012 | Gong et al. | ................ | 363/21.18 |
| 8,368,370 B2 * | 2/2013 | Morrish | ........................ | 323/282 |
| 2010/0134080 A1 * | 6/2010 | Ouyang | ........................ | 323/282 |
| 2010/0301827 A1 * | 12/2010 | Chen et al. | ..................... | 323/299 |
| 2011/0062928 A1 * | 3/2011 | Tobin et al. | ..................... | 323/283 |
| 2012/0049822 A1 | 3/2012 | Li et al. | | |
| 2012/0049824 A1 * | 3/2012 | Chen et al. | ..................... | 323/283 |
| 2012/0119719 A1 * | 5/2012 | Teh | ............................... | 323/282 |

* cited by examiner

*Primary Examiner* — Gary L Laxton
*Assistant Examiner* — Kyle J Moody
(74) *Attorney, Agent, or Firm* — Perkins Coie LLP

(57) ABSTRACT

A controller having an on-time controller, an off-time controller, a switch control signal generator, and a jittering signal generator, wherein the jittering signal generator couples jitter into the on-time or the off-time of a primary switch of the power supply. Therefore the EMI performance may be improved.

14 Claims, 12 Drawing Sheets

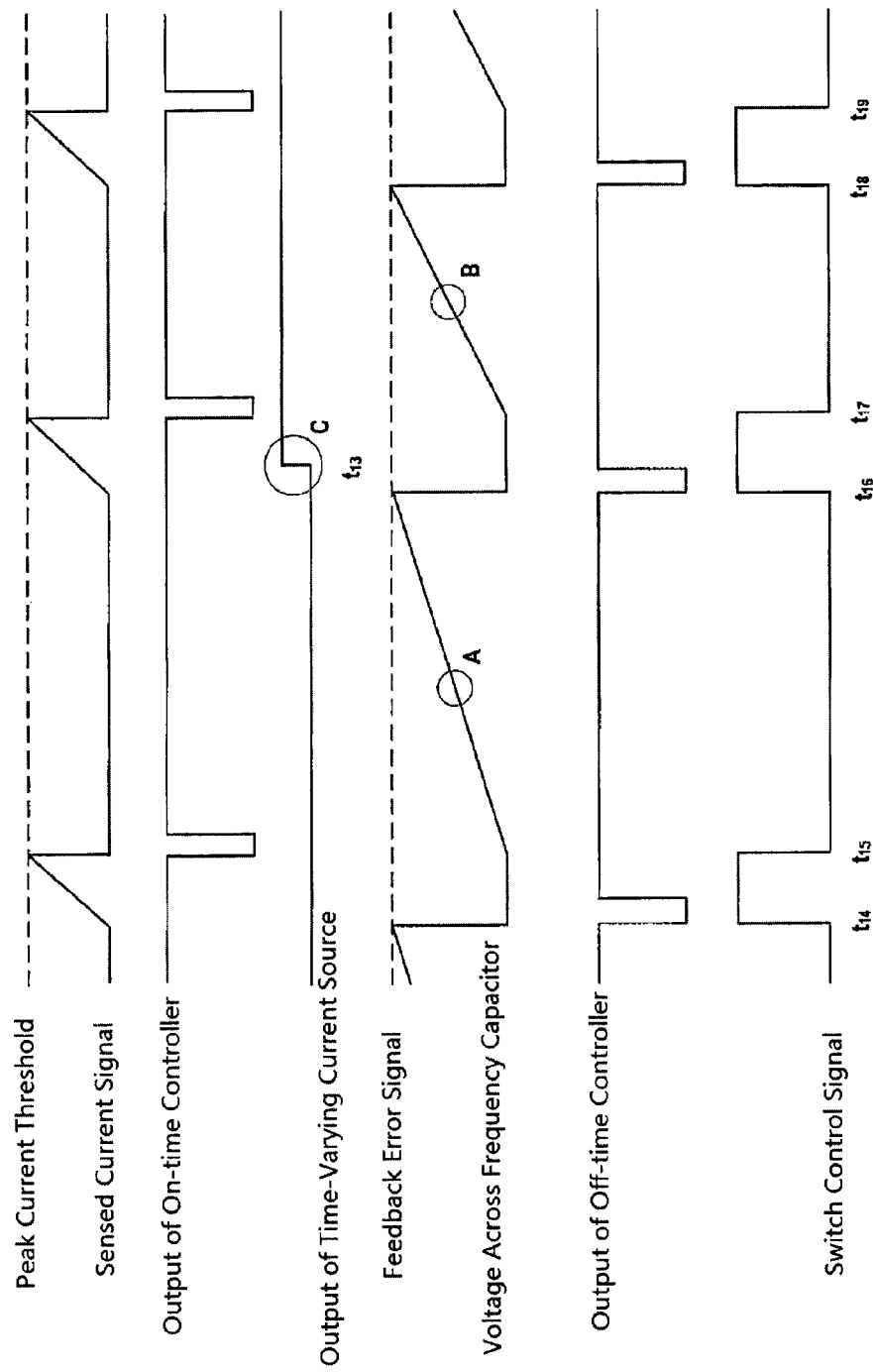

SWITCH-MODE POWER SUPPLY CONTROLLER AND ASSOCIATED METHOD

CROSS-REFERENCE TO RELATED APPLICATION(S)

This application claims the benefit of CN application No. 201110115892.6, filed on Apr. 29, 2011, and incorporated herein by reference.

TECHNICAL FIELD

The present invention relates to switch-mode power supply, and more particular relates to a controller and a method for reducing the electro magnetic interference (EMI) of a switch-mode power supply.

BACKGROUND

When designing a switch-mode power supply, EMI and electro magnetic compatibility (EMC) are the factors that should be considered.

For a constant frequency control method, frequency jitter is usually applied to lower the EMI energy at a frequency with narrow frequency range. By dithering the switching frequency periodically or non-periodically, the EMI energy may be dispersed in a relatively wide frequency range, so as to meet the EMI standard.

However, for other control methods, the switching frequency is not constant because of the interference from other signals. For an instance, for a constant on-time control method, load change and the oscillation of alternative current (AC) line voltage may both affect the off-time, and further the switching frequency. In addition, the on-time is also affected by the load change and the oscillation of AC line voltage. Therefore, for a system without a constant frequency control method, due to certain characteristics of itself, for example, the ripple of the rectified AC input voltage, the switching frequency may be jittering. But the magnitude of this jittering is not large enough. Thus new frequency jittering structure is required to lower the energy of EMI.

SUMMARY

One embodiment of the present invention discloses a switch-mode power supply controller. The controller receives a sensed current signal, a peak current threshold, and a feedback error signal, operable to generate a switch control signal. The switch-mode power supply controller comprises an on-time controller, receiving the sensed current signal, and generating a switch-off signal to determine an on-time of a primary switch when the sensed current signal reaches the peak current threshold; an off-time controller, receiving the feedback error signal and the switch control signal, generating a switch-on signal to determine an off-time of the primary switch after the primary switch is turned off, wherein the off-time depends on the feedback error signal; a switch control signal generator, receiving the switch-off signal and the switch-on signal, operable to generate the switch control signal; and a jittering signal generator, generating a first jittering signal, wherein the first jittering signal is configured to couple jitter into the on-time and/or the off-time of the primary switch.

Due to the utilization of the first jittering signal, the EMI power of the power supply may be dispersed in a relatively wide frequency range. Therefore the EMI performance of the power supply may be improved.

BRIEF DESCRIPTION OF THE DRAWINGS

Non-limiting and non-exhaustive embodiments are described with reference to the following drawings. The drawings are only for illustration purpose.

FIG. 14 illustrates an operational wave forms diagram of the fly-back AC-DC converter 10 applying the controller 100" shown in FIG. 13 according to yet another embodiment of the present invention.

The use of the same reference label in different drawings indicates the same or like components.

DETAILED DESCRIPTION

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present technology may be practiced without these specific details. In other instances, well-known methods, procedures, components, and circuits have not been described in detail so as not to unnecessarily obscure aspects of the present invention.

Figure 1:
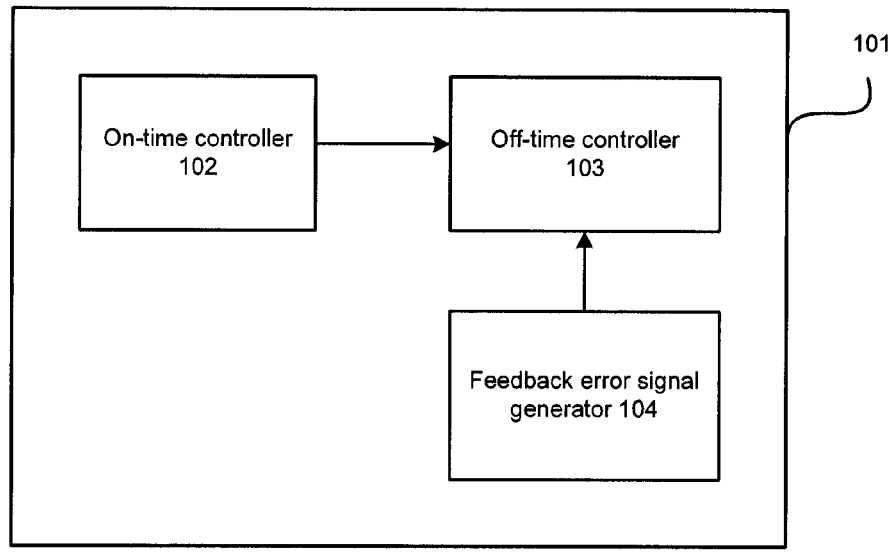
FIG. 1 illustrates a schematic block diagram of a switch-mode power supply controller according to an embodiment of the present invention.

FIG. 1 illustrates a schematic block diagram of a switch-mode power supply controller according to an embodiment of the present invention. As shown in FIG. 1, in the illustrated embodiment, a switch-mode power supply controller 101 comprises an on-time controller 102 and an off-time controller 103. On-time controller 102 receives a sensed current signal, and generates a switch-off signal to determine an on-time of a primary switch when the sensed current signal reaches a peak current threshold. The switch-off signal sets a switch control signal to off-state. Off-time controller 103 receives the feedback error signal and the switch control signal, generates a switch-on signal to determine an off-time of the primary switch after the primary switch is turned off, wherein the off-time depends on the feedback error signal. The peak current threshold is jittering along with time.

In certain embodiments, the peak current threshold dithers periodically, wherein the cycle of the peak current threshold is different from an average operation cycle of the primary switch. In one embodiment the cycle of the peak current threshold is larger than the average operation cycle of the primary switch. The term "average operation cycle" of primary switch hereby and in the following text refers the average value of the on-time plus the off-time for the primary switch along time. In another embodiment, the jitter amplitude of the peak current threshold is smaller than the average amplitude of the peak current threshold.

In one embodiment, the peak current threshold is a voltage signal. The peak current threshold comprises a first jittering signal generated from a jittering signal generator and a constant reference voltage generated from a first reference voltage source, wherein the jittering signal generator may be a time-varying voltage source.

In one embodiment, the first jittering signal may be a sine wave signal or a triangle wave signal.

In one embodiment, the switch-on signal and the switch-off signal are low-level-on signals, wherein the switch-on signal is coupled to a set end of a RS flip-flop, and wherein the switch-off signal is coupled to a reset end of the RS flip-flop. A Q end output of the RS flip-flop serves as a switch control signal, and the RS flip-flop serves as a switch control signal generator.

In one embodiment, controller 101 further comprises a feedback error signal generator 104, wherein feedback error signal generator receives a feedback output signal of switch-mode power supply, and a second reference voltage, operable to generate the feedback error signal.

In one embodiment, the off-time controller 103 comprises a timer, wherein the timer is triggered to count the off-time initiating from the moment when the switch control signal is set to off-state.

In one embodiment, the timer comprises a current source, a frequency capacitor and a comparator. The current source generates a charging current to charge the frequency capacitor initiating from the moment when the switch control signal is set to off-state; and the comparator generates a switch-on signal when the voltage across the frequency capacitor reaches the feedback error signal.

Figure 2:
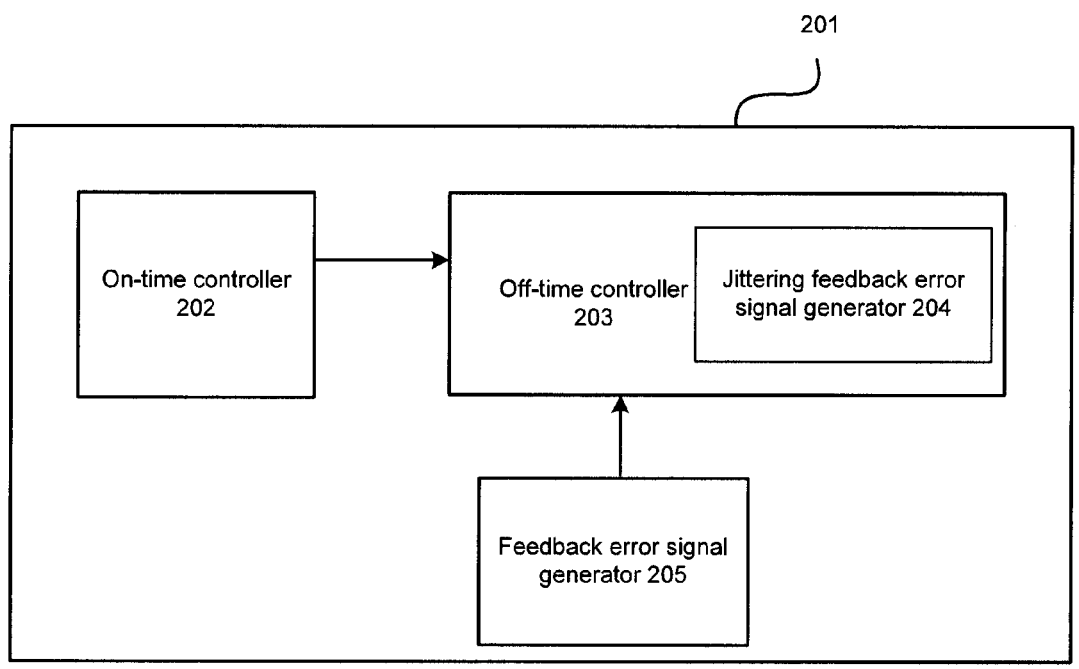
FIG. 2 illustrates a schematic block diagram of another switch-mode power supply controller according to another embodiment of the present invention.

FIG. 2 illustrates a schematic block diagram of another switch-mode power supply controller according to another embodiment of the present invention. As shown in FIG. 2, in the illustrated embodiment, a switch-mode power supply controller 201 comprises an on-time controller 202 and an off-time controller 203. On-time controller 202 receives a sensed current signal, and generates a switch-off signal to determine an on-time of a primary switch when the sensed current signal reaches a peak current threshold. The switch-off signal sets a switch control signal to off-state. Off-time controller 203 receives the feedback error signal and the switch control signal, and generates a switch-on signal to determine an off-time of the primary switch after the primary switch is turned off, wherein the off-time depends on the feedback error signal.

Off-time controller 203 further comprises a jittering feedback error signal generator 204 as a jittering signal generator. Jittering feedback error signal generator 204 couples a first jittering signal into the feedback error signal to form a jittering feedback error signal. The off-time of the primary switch depends on the jittering feedback error signal. Wherein the jittering feedback error signal generator 204 may be a time-varying voltage source.

In certain embodiments, the feedback error signal dithers periodically, wherein the cycle of the feedback error signal is different from an average operation cycle of the primary switch. In one embodiment the cycle of the feedback error signal is larger than the average operation cycle of the primary switch. In another embodiment, the jitter amplitude of the feedback error signal is smaller than the average amplitude of the feedback error signal In one embodiment, the first jittering signal may be a sine wave signal or a triangle wave signal.

In one embodiment, the switch-on signal and the switch-off signal are low-level-on signals, wherein the switch-on signal is coupled to a set end of a RS flip-flop, and wherein the switch-off signal is coupled to a reset end of the RS flip-flop. A Q end output of the RS flip-flop serves as a switch control signal, and the RS flip-flop serves as a switch control signal generator.

In one embodiment, controller 201 further comprises a feedback error signal generator 205, wherein feedback error signal generator receives a feedback output signal of switch-mode power supply, and a second reference voltage, operable to generate the feedback error signal.

In one embodiment, the off-time controller 203 further comprises a timer, wherein the timer is triggered to count the off-time initiating from the moment when the switch control signal is set to off-state.

In one embodiment, the timer comprises a current source, a frequency capacitor and a comparator. The current source generates a charging current to charge the frequency capacitor initiating from the moment when the switch control signal is set to off-state; and the comparator generates a switch-on signal when the voltage across the frequency capacitor reaches the feedback error signal.

In one embodiment, a second jittering voltage signal is further coupled into the peak current threshold to dither the peak current threshold and to influence the on-time of the primary switch. The second jittering voltage signal may also generated by the jittering feedback error signal generator 204.

Figure 3:
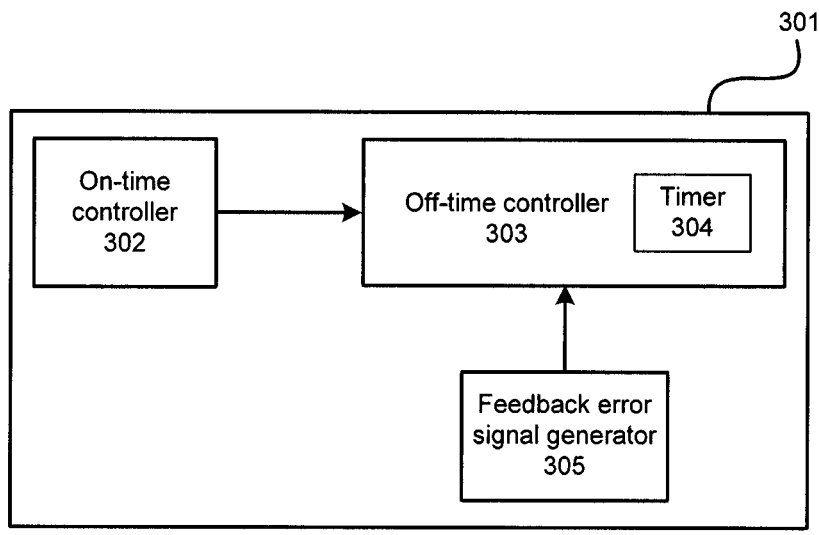
FIG. 3 illustrates a schematic block diagram of yet another switch-mode power supply controller according to yet another embodiment of the present invention.

FIG. 3 illustrates a schematic block diagram of yet another switch-mode power supply controller according to yet another embodiment of the present invention. As shown in FIG. 3, in the illustrated embodiment, a switch-mode power supply controller 301 comprises an on-time controller 302 and an off-time controller 303. On-time controller 302 receives a sensed current signal, and generates a switch-off signal to determine an on-time of a primary switch when the sensed current signal reaches a peak current threshold. The switch-off signal sets a switch control signal to off-state. Off-time controller 303 receives the feedback error signal and the switch control signal, and generates a switch-on signal to determine an off-time of the primary switch after the primary switch is turned off, wherein the off-time depends on the feedback error signal.

The off-time controller 303 further comprises a timer 304, wherein the timer is triggered to count the off-time initiating from the moment when the switch control signal is set to off-state. In one embodiment, the timer comprises a time-varying current source as a jittering signal generator, a frequency capacitor and a comparator. The current source generates a charging current to charge the frequency capacitor initiating from the moment when the switch control signal is set to off-state; and the comparator generates a switch-on signal when the voltage across the frequency capacitor reaches the feedback error signal.

In certain embodiments, the time-varying current source generates a time-varying current, wherein the time-varying current dithers periodically. In one embodiment the cycle of the time-varying current is larger than the average operation cycle of the primary switch. In another embodiment, the jitter amplitude of the time-varying current is smaller than the average amplitude of the feedback error signal In one embodiment, the timer further comprises a constant current source to provide a constant current. The constant current and the time-varying current are coupled together to form the charging current, wherein the amplitude of the constant current is relatively large, and the amplitude of the time-varying current is relatively small.

In one embodiment, the time-varying current may be a sine wave current, a triangle wave current or a square wave current. In another embodiment, the time-varying current hops to one of a plurality of constant values for each of a constant period.

In one embodiment, controller 301 further comprises a feedback error signal generator 305, wherein feedback error signal generator receives a feedback output signal of switch-mode power supply, and a second reference voltage, operable to generate the feedback error signal.

Figure 4:
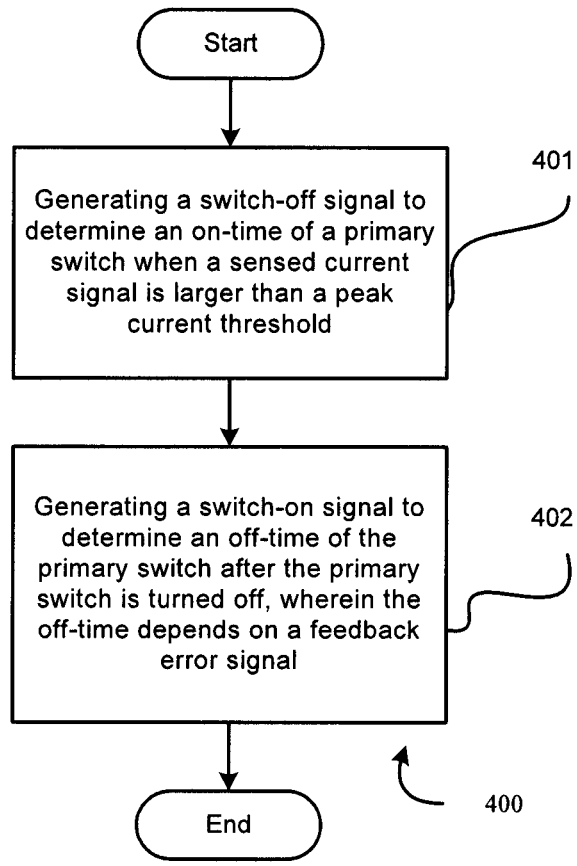
FIG. 4 illustrates an operational process flow diagram of a method for controlling a switch-mode power supply according to an embodiment of the present invention.

FIG. 4 illustrates a process flow chart 400 of a method for controlling a switch-mode power supply according to an embodiment of the present invention. As shown in FIG. 4, at step 401, when a sensed current signal reaches the peak current threshold, a switch-off signal is generated to set a switch control signal to off-state. At step 402, the switch control signal and a feedback error signal are received, and a switch-on signal is generated after an off-time initiating from the moment when the switch control signal is set to off-state. The switch control signal is configured to control a primary switch. The off-time depends on the feedback error signal, and the peak current threshold dithers along with time.

According to one embodiment, the peak current threshold dithers periodically, and the cycle of the peak current threshold is different from the average operational cycle of the primary switch.

According to another embodiment, the peak current threshold dithers randomly, and the jitter has a relationship with white noise. The relationship may comprise without limitation that the jittering frequency of the peak current threshold is similar to the jittering frequency of white noise, or that the jitter is generated from white noise. In another embodiment, the white noise is filtered and a special frequency range of white noise is remained.

According to yet another embodiment, the jittering cycle of the peak current threshold is larger than the average operational cycle of the switch.

And in further another embodiment, the jittering amplitude of the peak current threshold is smaller than the average value of the peak current threshold.

In some embodiments, the sensed current signal is a voltage signal. A constant reference voltage from a first reference voltage source and a first jittering voltage signal from a jittering signal generator are coupled together to comprise the peak current threshold.

In one embodiment, the first jittering signal may be a sine wave signal or a triangle wave signal.

In one embodiment, the switch-off signal and the switch-on signal are low-level-on signal, wherein the switch-off signal is coupled to a reset end of a RS flip-flop, and the switch-on signal is coupled to a set end of the RS flip-flop. The Q end output of the RS flip-flop serves as the switch control signal.

In one embodiment, the method for controlling the power supply further comprises generating the feedback error signal according to the difference between a feedback output signal of the power supply and a second reference voltage.

In certain embodiments, a timer is triggered to begin timing at the moment when the switch control signal is set to off-state.

In one embodiment, the timer comprises a current source, a frequency capacitor and a comparator. The current source charges the frequency capacitor after the timer is triggered, so that the voltage across the frequency capacitor increases gradually. Then the comparator is utilized to compare the voltage across the frequency capacitor with the feedback error signal. When the voltage across the frequency capacitor is larger than the feedback error signal, the switch-on signal is generated.

Figure 5:
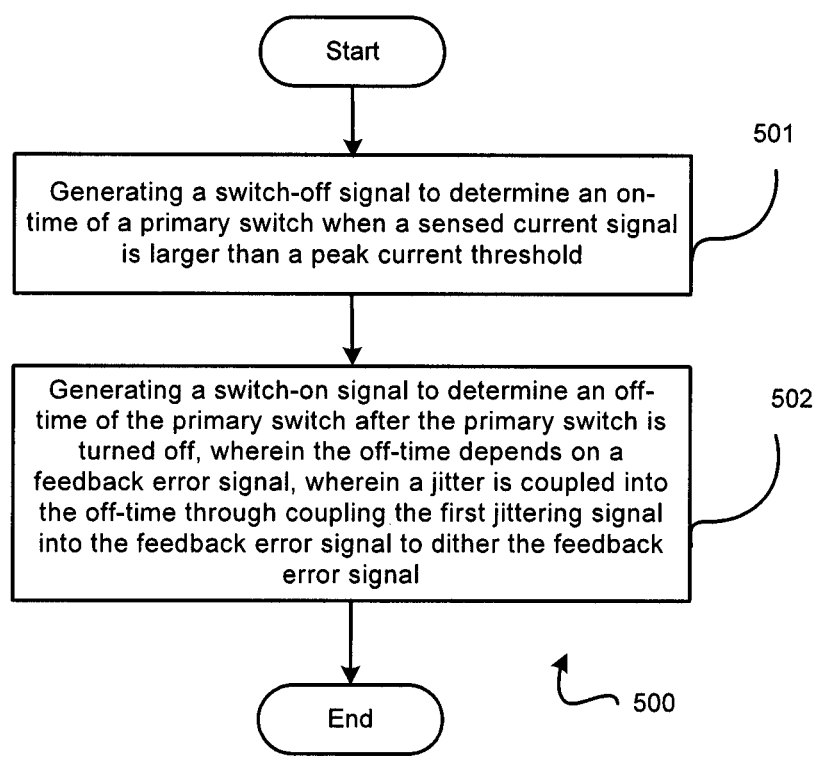
FIG. 5 illustrates an operational process flow diagram of another method for controlling a switch-mode power supply according to another embodiment of the present invention.

FIG. 5 illustrates another flow chart 500 of a method for controlling a switch-mode power supply according to another embodiment of the present invention. As shown in FIG. 5, at step 501, when a received sensed current signal reaches a peak current threshold, a switch-off signal is generated to set a switch control signal to off state. At step 502, the switch control signal and a feedback error signal are received, and a switch-on signal is generated after an off-time initiating from the moment when the switch control signal is set to off-state, wherein a first jittering signal generated by a jittering signal generator is coupled into the feedback error signal to dither the feedback error signal. In one embodiment, the first jittering signal may be a time-varying voltage source. The switch control signal is configured to control a primary switch in the power supply. The off-time depends on the feedback error signal.

According to one embodiment, the feedback error signal dithers periodically, and the cycle of the feedback error signal is different from the average operational cycle of the primary switch.

According to another embodiment, the feedback error signal dithers randomly, and the jitter has a relationship with white noise. The relationship may comprise but not be limited to that the jittering frequency of feedback error signal is similar to the jittering frequency of white noise, or that the jitter is generated from white noise. In another embodiment, the white noise is filtered and a special frequency range of white noise is remained.

In yet another embodiment, the jittering cycle of the first jittering signal is larger than the average operation cycle of the primary switch.

In further another embodiment, the jittering amplitude of the feedback error signal is smaller than the average value of the feedback error signal.

In one embodiment, the first jittering signal is a sine wave signal or a triangle wave signal.

In one embodiment, the switch-off signal and the switch-on signal are low-level-on signal. The switch-off signal is coupled to a reset end of a flip-flop, and the switch-on signal is coupled to a set end of the flip-flop. A Q end output of the flip-flop serves as the switch control signal.

In one embodiment, the method for controlling the switch-mode power supply further comprises generating the feedback error signal according to the difference between a feedback output signal of the power supply and a second reference voltage.

In certain embodiments, a timer is triggered to begin timing at the moment when the switch control signal is set to off-state.

In one embodiment, the timer comprises a current source, a frequency capacitor and a comparator. The current source charges the frequency capacitor after the timer is triggered, so that the voltage across the frequency capacitor increases gradually. Then the comparator is utilized to compare the voltage across the frequency capacitor with the feedback error signal. When the voltage across the frequency capacitor reaches the feedback error signal, the switch-on signal is generated.

In one embodiment, the peak current threshold also dithers along with time.

Figure 6:
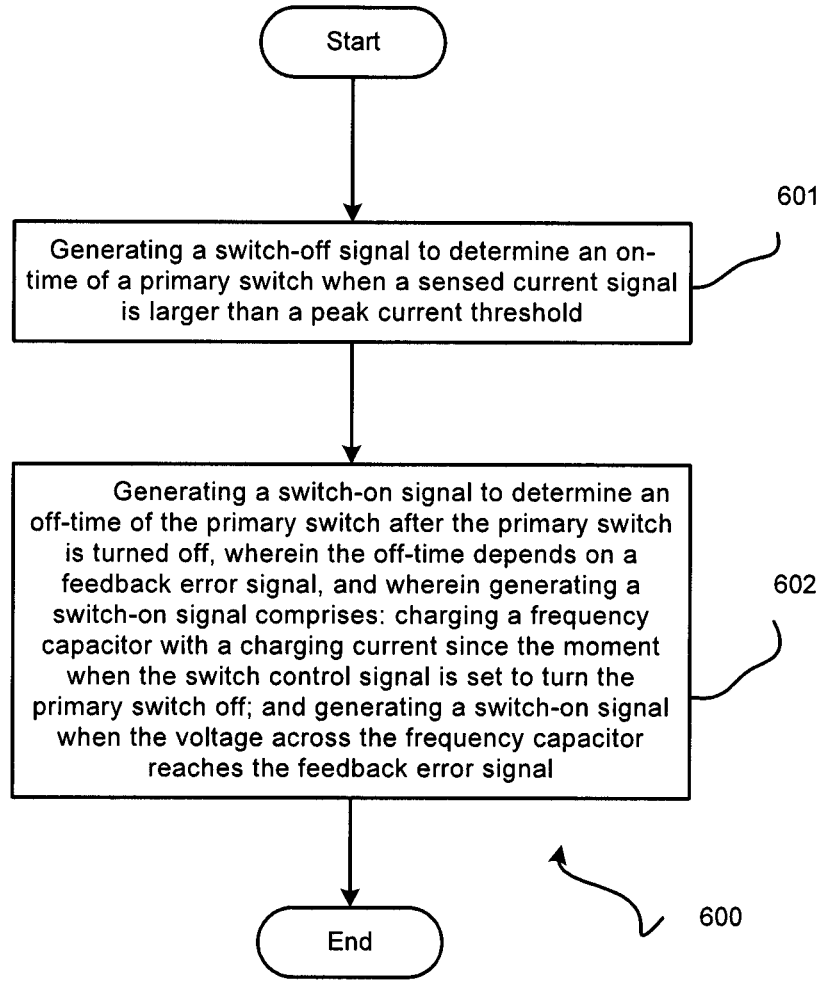
FIG. 6 illustrates an operational process flow diagram of yet another method for controlling a switch-mode power supply according to yet another embodiment of the present invention.

FIG. 6 illustrates yet another flow chart 600 of a method for controlling a switch-mode power supply according to another embodiment of the present invention. As shown in FIG. 6, at step 601, when a received sensed current signal reaches a peak current threshold, a switch-off signal is generated to set a switch control signal to off-state. At step 602, the switch control signal and a feedback error signal are received, and a switch-on signal is generated after an off-time initiating from the moment when the switch control signal is set to off-state, wherein a timer is triggered to begin timing at the moment when the switch control signal is set to off-state. The timer comprises a time-varying current source, a frequency capacitor and a comparator. The time-varying current source serves as a jittering signal generator. The time-varying current source charges the capacitor when the timer is triggered, so that the voltage across the capacitor increases gradually. Then the comparator is utilized to compare the voltage across the capacitor with the feedback error signal. When the voltage across the capacitor is larger than the feedback error signal, the switch-on signal is generated.

In some embodiments, a jittering current generated from the time-varying current source dithers periodically. The jittering current serves as a first jittering signal.

In one embodiment, the jittering cycle of the jittering current is significantly larger than the average operational cycle of the primary switch.

In another embodiment, the jittering current dithers randomly for each a constant period. In yet another embodiment, the constant period is significantly longer than the average operational cycle of the switch.

In further another embodiment, the timer further comprises a constant current source. A constant current generated by the constant current source and the jittering current are coupled together to charging the frequency capacitor. In one embodiment, the constant current source provides a relatively large constant current, and the time-varying current source for provides a relatively small time-varying current.

According to one embodiment, the jittering current is a sine wave current, or a triangle wave current, or a square wave current. In another embodiment, the jittering current hops to one of a plurality of constant values for each of a constant period.

In one embodiment, the method for controlling the power supply further comprises generating the feedback error signal according to the difference between the output feedback signal and a second reference voltage.

A fly-back AC-DC converter is described as an example in the following text to illustrate the method for controlling power supply and the associated power supply controller according to the embodiments of the present invention. One with ordinary skill in relevant art should understand that the application of the present invention is not limited to this fly-back AC-DC converter.

Figure 7:
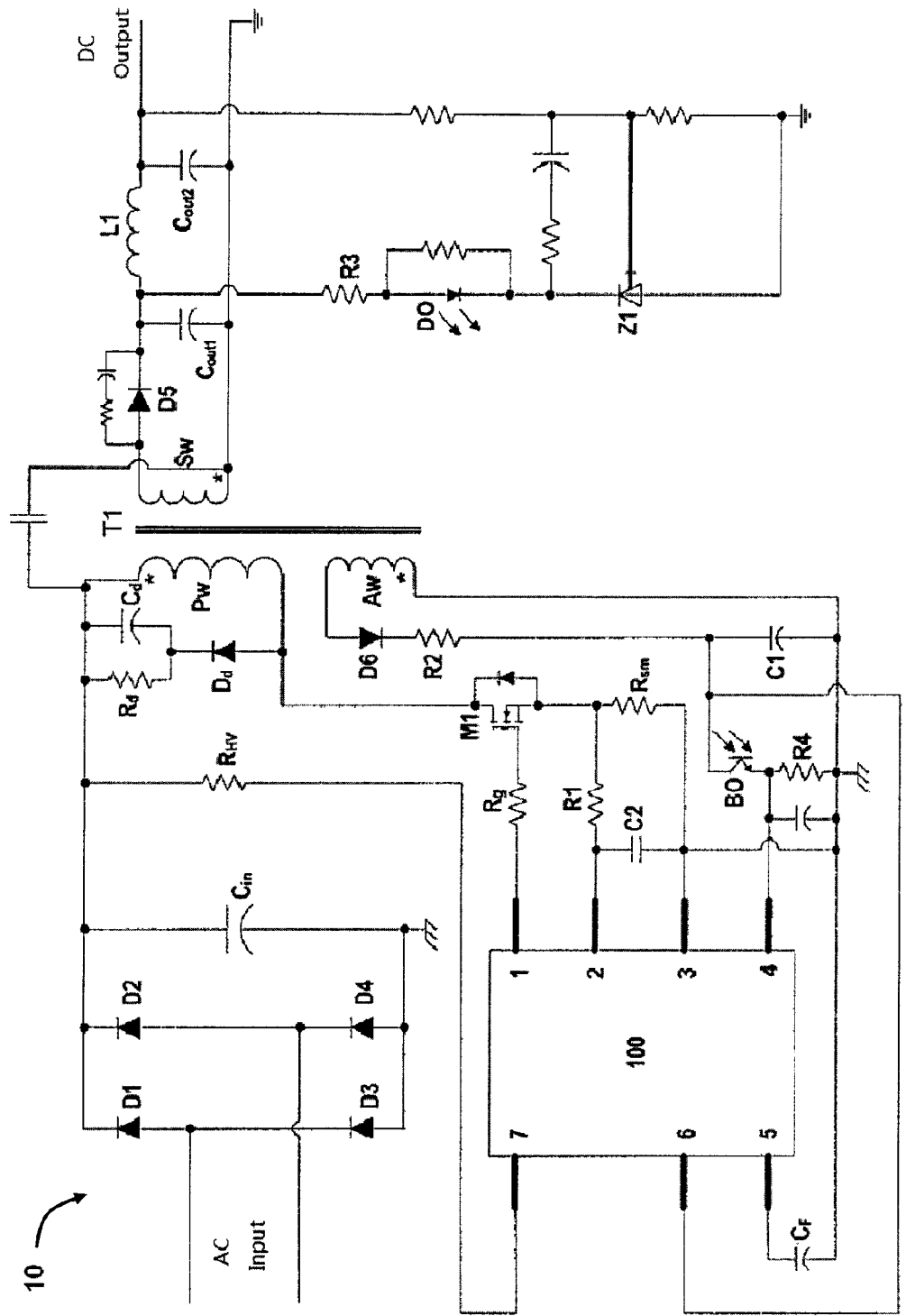
FIG. 7 illustrates a schematic circuitry diagram of a fly-back alternative current to direct current (AC-DC) converter 10 according to an embodiment of the present invention.

FIG. 7 illustrates a schematic circuitry diagram of a fly-back AC-DC converter 10 with a switch-mode power supply controller 100 according to one embodiment of the present invention. As shown in FIG. 7, the fly-back AC-DC converter 10 comprises a transformer T1, wherein the transformer T1 comprises a primary winding PW, a secondary winding SW and an auxiliary winding AW. The primary winding PW, the secondary winding SW and the auxiliary winding AW are respectively to form the input part, the output part and the auxiliary power supply part of the fly-back AC-DC converter 10.

Seen in FIG. 7, in the input part of the fly-back AC-DC converter 10, an input rectifying and filtering module is coupled between an AC input and a first end of the primary winding PW. The input rectifying and filtering module comprises a rectifier bridge which is formed by four diodes D1, D2, D3 and D4, and an input filer capacitor Cin which is configured to rectify and smooth the AC input voltage into a substantial DC input voltage. A high voltage resistor Rhv is coupled between the output end of the output rectifying and filtering module and a high level input voltage pin 7 of the switch-mode power supply controller 100. Through this high voltage resistor Rhv, the switch-mode power supply controller 100 obtains an initiation power from the input rectifying and filtering module.

A primary switch M1 is coupled in series with a current sense resistor Rsm. The primary switch M1 and the current sense resistor Rsm are further coupled between a second end of the primary winding PW and a reference ground. More detailedly, a drain terminal of the primary switch M1 is coupled to the second end of the primary winding PW, and the current sense resistor Rsm is coupled in series between the source terminal of the primary switch M1 and the reference ground. The gate terminal of the primary switch M1 is coupled to a driving signal output pin 1 of the controller 100 through a resistor Rg. In one embodiment, the voltage across the resistor Rsm is provided to a sensed current input pin 2 of the controller 100 via a low pass filter which comprises a resistor R1 and a capacitor C2. In another embodiment, the low-pass filter may be omitted. In yet another embodiment, the low-pass filter may be integrated into the controller 100.

A discharge breach circuit is coupled between the first end and the second end of the primary winding PW. The discharge breach circuit comprises a resistor Rd and a capacitor Cd. The resistor Rd and the capacitor Cd are coupled with each other in parallel, and a diode Dd coupled with them in series. In other embodiments, the input part may further comprise other suitable functional components.

Continuing in FIG. 7, in the output part of the fly-back AC-DC converter 10, a first end of the secondary winding SW is coupled to the reference ground. A diode D4 and an output capacitor Cout1 are coupled in series. And then the diode D4 and the output capacitor Cout1 are further coupled between the second end of the secondary winding SW and the reference ground. Meanwhile an inductor L1 and a capacitor Cout2 together comprise an output filter, and are in series coupled between the cathode of the diode D5 and the reference ground. The voltage across the capacitor Cout2 serves as the output voltage Vout. In other embodiments, the output part may further comprise other suitable functional components.

In the auxiliary part of the fly-back AC-DC converter 10, similar to the secondary winding SW, a first end of the auxiliary winding AW is connected to the reference ground. Between a second end of the auxiliary winding AW and the reference ground, a diode D6, a resistor R2 and a capacitor C1 are coupled in series. The voltage across the capacitor C1 serves as the power supply voltage Vcc of the controller 100.

The fly-back AC-DC converter 10 may further comprise a voltage feedback loop. The voltage feedback loop feedbacks the output voltage to the controller 100 and primarily comprises a transmission breach and a reception breach. The transmission breach comprises a resistor R3 which is coupled between the cathode of the diode D5 and the reference ground. The transmission breach further comprises a diode portion DO of an optical coupler, and a three-terminal adjustable shunt regulator Z1. The reception breach comprises a bipolar transistor portion BO of the optical coupler, and a resistor R4 coupled in series with the transistor portion BO. A collector of the bipolar transistor BO is coupled to the common junction of the resistor R2 and capacitor C1. A first end of the resistor R4 is coupled to an emitter of the bipolar transistor BO, and a second end of R4 is connected to the reference ground. The voltage on the emitter of the bipolar transistor BO is provided to a feedback voltage input pin 4 of the controller 100 as the feedback output voltage.

The controller 100 is described in the following text. In one embodiment, the controller 100 comprises 7 pins labeled as 1 to 7, wherein pin 1 is driving signal output pin; pin 2 is sensed current input pin, wherein through the filter formed by the resister R1 and the capacitor C2, the pin 2 is coupled to the common junction between the current sense resistor Rsm and the drain terminal of the switch M1; pin 3 is ground pin, connected to the reference ground; pin 4 is feedback voltage input pin, wherein pin 4 receives a feedback voltage signal Vfb generated by the diode DO and the resistor R4; pin 5 is a frequency setting pin, coupled to a frequency capacitor Cf, wherein the value of the capacitor Cf decides the maximum switching frequency of the controller 100; pin 6 is power supply Vcc pin, receiving the power supply voltage from auxiliary winding AW through the diode D6 and the resistor R2; pin 7 is high level input voltage pin, receiving the high level input voltage on the input filter Cin. The high level input voltage utilized as the power supply of the controller 100 when the fly-back AC-DC converter is initiated. One with ordinary skill in relevant art should understand that the pin numbers and function distribution are only for illustration. In other embodiments, more or less pins with different function may be applied, or the specific function distribution may be different from above description. In certain embodiments, controller 100 may further comprise some pins which are only for satisfying the packaging standard.

The inner structure of controller 100 is depicted below. It should be noted that for better understanding, some essential components for controller 100 may be omitted in the drawings and descriptions. One with ordinary skill in relevant art should note that disappearance of these components hereby does not indicate that these components are not existed in controller 100.

Figure 8:
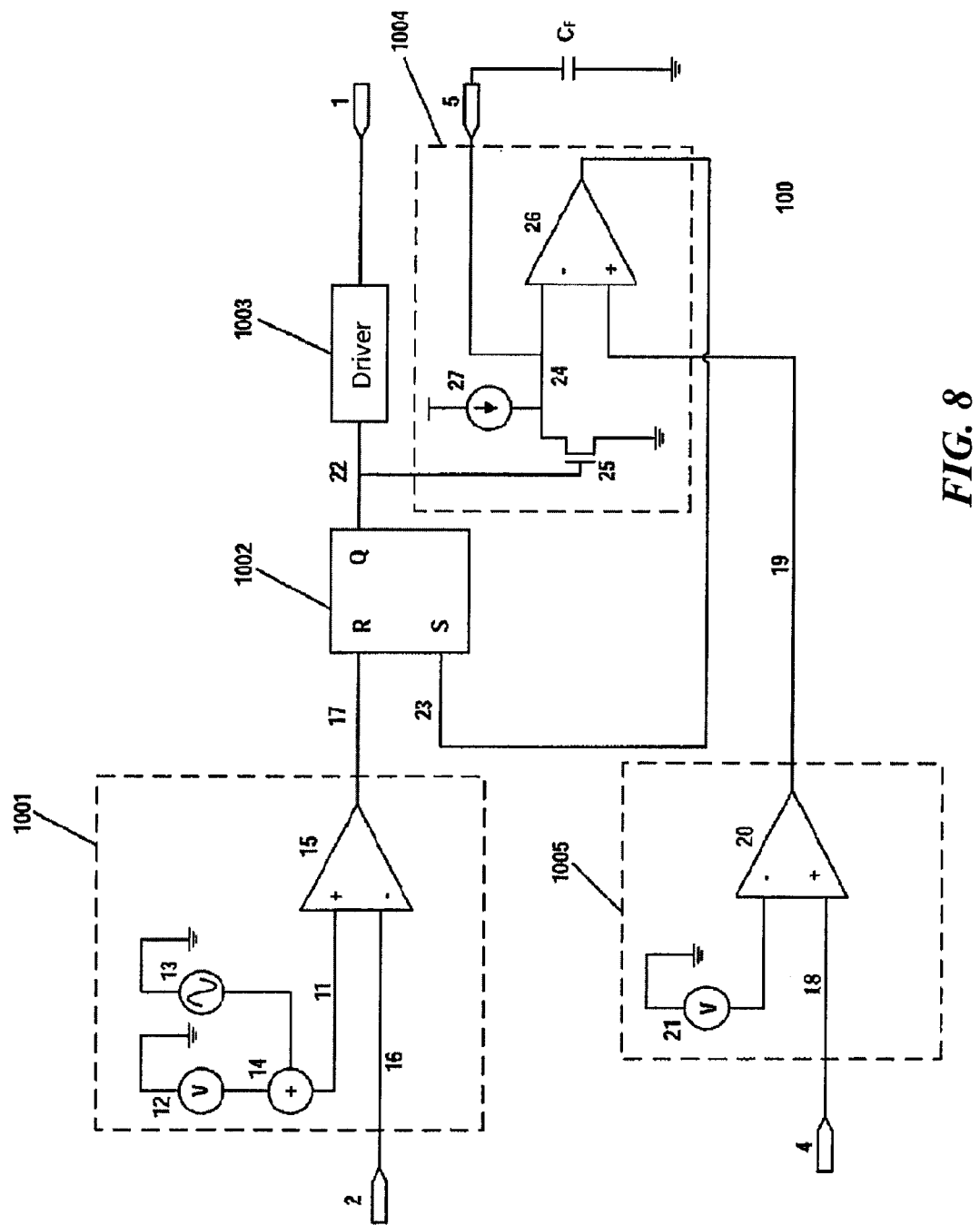
FIG. 8 illustrates a schematic circuitry diagram of a switch-mode power supply controller 100 applied in the fly-back AC-DC converter 10 shown in FIG. 7 according to an embodiment of the present invention.

Seen in FIG. 8, in one embodiment, controller 100 primarily comprises an on-time controller 1001, a RS flip-flop 1002, a switch driver 1003, an off-time controller 1004, and a feedback error signal generator 1005.

It should be noted that in FIG. 8, not all functional components are depicted. For example, the ground pin 3, power supply Vcc pin 6 and high level input voltage pin 7 in FIG. 7 are not shown in FIG. 8. However, it does not indicate that these pins and their associated coupled function components are not existed in controller 100. Specially, one with ordinary skill in relevant art should understand that in certain embodiments, a power management module may be coupled between power supply Vcc pin 6 and the ground pin 3, configured to provide power and reference voltages to the functional components in controller 100. Furthermore, one with ordinary skill in relevant art may understand in other embodiments, an initiation apparatus may be coupled between the high level input voltage pin 7 and the ground pin 3, configured to provide power and reference voltages to the functional components in controller 100.

The on-time controller 1001 receives a sensed current signal 16 at sensed current input pin 2. The sensed current signal 16 is compared with a peak current threshold 11. When the sensed current signal 16 reaches the peak current threshold 11, the on-time controller 1001 generates a switch-off signal on the output 17 of the on-time controller 1001.

In one embodiment, the sensed current signal is further processed before providing to the on-time controller 1001. The process may be including without limitation, filtering, amplifying, level shifting, converting the voltage signal into current signal or otherwise, etc.

As shown in FIG. 8, in one embodiment, the peak current threshold 11 and the sensed current signal 16 are voltage signals. On-time controller 1001 may primarily comprise a comparator 15. The comparator 15 has a positive input end and a negative input end, wherein the positive input end receives the peak current threshold 11, and wherein the negative input end is coupled to the current sense input pin 2 to receive the sensed current signal 16. When the sensed current signal 16 reaches the peak current threshold 11, an output 17 of the comparator 15 flops from high level to low level. In the illustrated embodiment, the output 17 of the comparator 15 is coupled to a reset end of the RS flip-flop 1002.

In the illustrated embodiment, the peak current threshold 11 dithers along with time. Seen in FIG. 8, an adder 14 is applied to couple a constant reference voltage (also referred as first reference voltage hereby and in the following text) generated from a constant voltage source 12 (also referred as first reference voltage source hereby and in the following text) to a jittering reference voltage (also referred as first jittering signal hereby and in the following text) generated from a time-varying voltage source 13 (also referred as jittering signal generator hereby and in the following text). One with ordinary skill in relevant art should understand that in other embodiments, a subtracter may be applied alternatively instead of the adder 14. In one embodiment, the wave form of the jittering reference voltage may be a sine wave signal or a triangle wave signal. In other embodiment, other suitable wave form may also be utilized. In another alternative embodiment, the peak current threshold 11 may be a current signal, wherein a constant reference current from a first reference current source and a jittering reference current from a time-varying current source are coupled together to form the peak current threshold.

In some embodiments, the jittering voltage from time-varying voltage source 13 may dither randomly. For example, in one embodiment, a noise voltage source may be applied directly or indirectly as the time-varying voltage source 13. In another embodiment, the noise voltage from the noise voltage source are further filtered before being applied, so that only a specified frequency range of noise voltage components are remained.

As the peak current threshold 11 dithers along with time, the illustrated embodiment of the present invention may lower down the EMI of the fly-back AC-DC converter 10. One with ordinary skill in relevant art may understand that other suitable methods different from the above description may also be applied to dither the peak current threshold voltage. For example, the peak current threshold may be generated from only a time-vary voltage source, wherein this jittering peak current threshold has an average value larger than zero. The jitter of the jittering reference voltage may be periodical or random.

In certain embodiments, peak current threshold 11 may dither along with time periodically and the jittering cycle is different from the average operational cycle of the primary switch M1. In one embodiment, the jittering cycle of the peak current threshold 11 is larger than the average operational cycle of the primary switch M1. In another embodiment, the jittering amplitude of the peak current threshold 11 is smaller than the time-average amplitude of the peak current threshold 11.

Although in the above description, the sensed current signal 16 and the peak current threshold 11 are both voltage signals, one with ordinary skill in relevant art should understand that the sensed current signal 16 and the peak current threshold 11 may also be current signals in other embodiments. For this occasion, the comparator 15 may be a current comparator.

The feedback error signal generator 1005 in controller 100 is coupled to the feedback voltage input pin 4, to receive a feedback voltage 18 from the fly-back AC-DC converter 10. In one embodiment, the input signal on feedback voltage input pin 4 is processed before providing to feedback error signal generator 1005. The process may comprises, without limitation, filtering, amplifying, level shifting and converting voltage signal to current signal or otherwise, etc.

The feedback error signal generator 1005 amplifies the error between the feedback voltage 18 and a constant reference voltage, and thus generates a feedback error signal 19. The feedback error signal generator 1005 may comprise an error amplifier 20, wherein an inverting end receives the constant reference voltage (also referred as the second reference voltage hereby and in the following text) from a constant reference voltage source 21 (also referred as the second reference voltage source hereby and in the following text.), and wherein a non-inverting end receives the feedback voltage 18.

In the illustrated embodiment, the off-time controller 1004 in controller 100 receives the feedback error signal 19 from the feedback error signal generator 1005. And the off-time controller 1004 further receives a Q end output 22 of the RS flip-flop 1002. An output signal 23 of the off-time controller 1004 is coupled to the set end of the RS flip-flop 1002. Through the pin 5 of controller 100, the off-time controller 1004 is further coupled to the frequency capacitor Cf of the fly-back AC-DC converter 10.

As shown in FIG. 8, in one embodiment, the off-time controller 1004 comprises an NMOS 25, a comparator 26 and a current source 27. The gate end of the NMOS 25 is coupled to the Q end output 22 of the RS flip-flop 1002, and the source end is connected to the reference ground, and the drain end is coupled to a node 24. In addition, a first end of the frequency capacitor Cf is also coupled to the node 24 through the frequency setting pin 5. The node 24 serves as the negative input end of the comparator 26. The feedback error signal 19 generated from feedback error signal generator 1005 is coupled to the positive input end of comparator 26. The output of comparator 26 is utilized as the output 23 of the off-time controller 1004.

When the output Q end output 22 of the RS flip-flop 1002 is at high level (logic 1), the NMOS 25 turns on. Through NMOS 25, the current generated from the current source 27 flows to the reference ground. By utilizing an NMOS with a relatively large gate length (with low on-state resistance and corresponding low voltage drop), the voltage level of node 24 is relatively low or substantially near zero. The output 23 of the comparator 26 is at high level.

When the Q end output 22 of the RS flip-flop 1002 flops from high level (logic 1) to low level (login 0), NMOS 25 is cut off. The current generated from current source 27 charges the frequency capacitor Cf through the frequency setting pin 5. When the voltage across the frequency capacitor Cf reaches the feedback error signal generator 19, the output 23 of comparator 26 flops from high level to low level, and thus the Q end output 22 of the RS flip-flop 1002 is restored to high level.

One with ordinary skill in relevant art should understand that current source 27, comparator 26 and the frequency capacitor Cf comprise a timer. When the Q end signal 22 of RS flip-flop 1002 flops from high level (logic 1) to low level (logic 0), this timer is triggered. After an off-time, the voltage across the frequency capacitor Cf reaches the feedback error signal 19, and the output 23 of comparator 26 turns from high level to low level to generate the switch-on signal. One with ordinary skill in relevant art should understand that besides the current of current source 27 and the capacitance of the frequency capacitor Cf, the off-time also depends on the amplitude of feedback error signal 19.

In above description, the off-time controller 1004 is coupled to an external frequency capacitor Cf through the frequency setting pin 5 of the controller 100. However, one with ordinary skill in relevant art should understand in other embodiments, the off-time controller 1004 may alternatively comprise an internal frequency capacitor coupled with node 24. For this occasion, the frequency setting pin 5 and the external frequency capacitor Cf may be omitted.

The driver 1003 in the controller 100 receives the Q end output 22, and accordingly drives the primary switch M1 ON and OFF through the pin 1.

Figure 9:
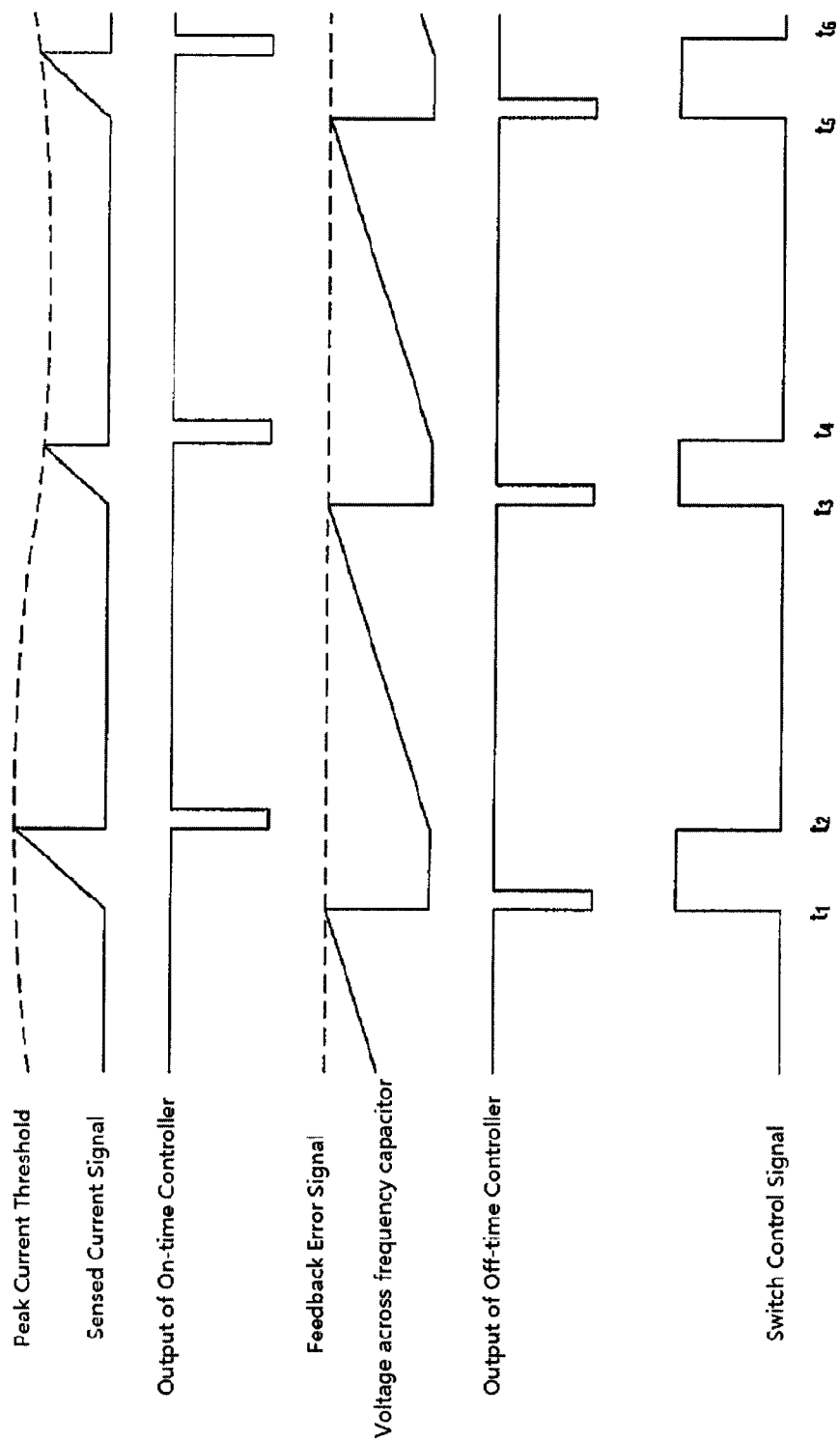
FIG. 9 illustrates an operational wave forms diagram of the fly-back AC-DC converter shown in FIG. 7 according to an embodiment of the present invention.

According to FIG. 7 and FIG. 8, FIG. 9 illustrates a wave form diagram to indicate the stable operation process of fly-back AC-DC converter 10.

From top to bottom, FIG. 9 respectively depicts the wave forms of peak current threshold 11 (with a sine wave jitter component), the sensed current signal 16, the output of on-time controller 1001 (the signal on the reset end of the RS flip-flop 1002), the feedback error signal 19, the voltage across the frequency capacitor Cf, the output of off-time controller 1004 (the signal on the set end of the RS flip-flop 1002) and the switch control signal 22. One with ordinary skill in relevant art should understand that these figures are illustrative but not scaled. Different signals may be illustrated with different amplify magnification factors and some parts of certain signal may be amplified or shrunk.

At the beginning of an operation cycle, for example, before a moment t1 in FIG. 9, the switch control signal is at low level. The primary switch M1 is cut off. The sensed current signal 16 is zero. The output of on-time controller 1001 is at high level. As the switch control signal is at low level, the NMOS 25 in off-time controller 1004 is cut off. Thus the current source 27 charges the frequency capacitor Cf through the frequency setting pin 5, and the voltage across the frequency capacitor Cf gradually increases.

When the voltage across the Cf reaches the feedback error signal, for example, at the moment t1, the output of comparator 26 flops from high level to low level. As described above, the Q end output 22 turns to high level to turn the NMOS 25 on. The charge on the frequency capacitor Cf is released, and the voltage across the frequency capacitor Cf returns to low level. As a result, the output 23 of the comparator 26 returns to high level. As shown in FIG. 9, the wave form of the output of off-time controller 1004 is a high-to-low pulse. This high-to-low pulse is configured to trigger a low-to-high pulse on the Q end output 22 of the RS flip-flop 1002. This high-to-low pulse is considered as the switch-on signal in the illustrated embodiment.

The switch control signal is set to turn the primary switch M1 on at high level. Because of the resistance of the primary winding PW, the current flowing through the primary switch M1 increases gradually. Shown in FIG. 9, the sensed current signal 16 also increases gradually from the moment t1.

When the sensed current signal 16 reaches the peak current threshold voltage 11, e.g. a moment t2, the output of comparator 15 flops from high level to low level, which sets the Q end output 22 (the switch control signal) of the RS flip-flop 1002 to the low level. Therefore the primary switch M1 is cut off and the sensed current signal 16 is lowered down to zero. The output of comparator 15 returns to high level. Seen in FIG. 9, the wave form of the output of the on-time controller 1001 is a high-to-low pulse. This high-to-low pulse triggers a high-to-low pulse on the Q end output 22 of RS flip-flops 1002. This high-to-low pulse is considered as the switch off signal in the illustrated embodiment.

After that, in off-time controller 1004, as the switch control signal is at low level, the NMOS 25 is cut off. Therefore the current source 27 charges the frequency capacitor Cf through the frequency setting pin 5 and the voltage across the frequency capacitor Cf increases gradually. When the voltage across the frequency capacitor Cf reaches the feedback error signal 19, for example, at a moment t3, the next operation cycle is beginning.

Figure 10:
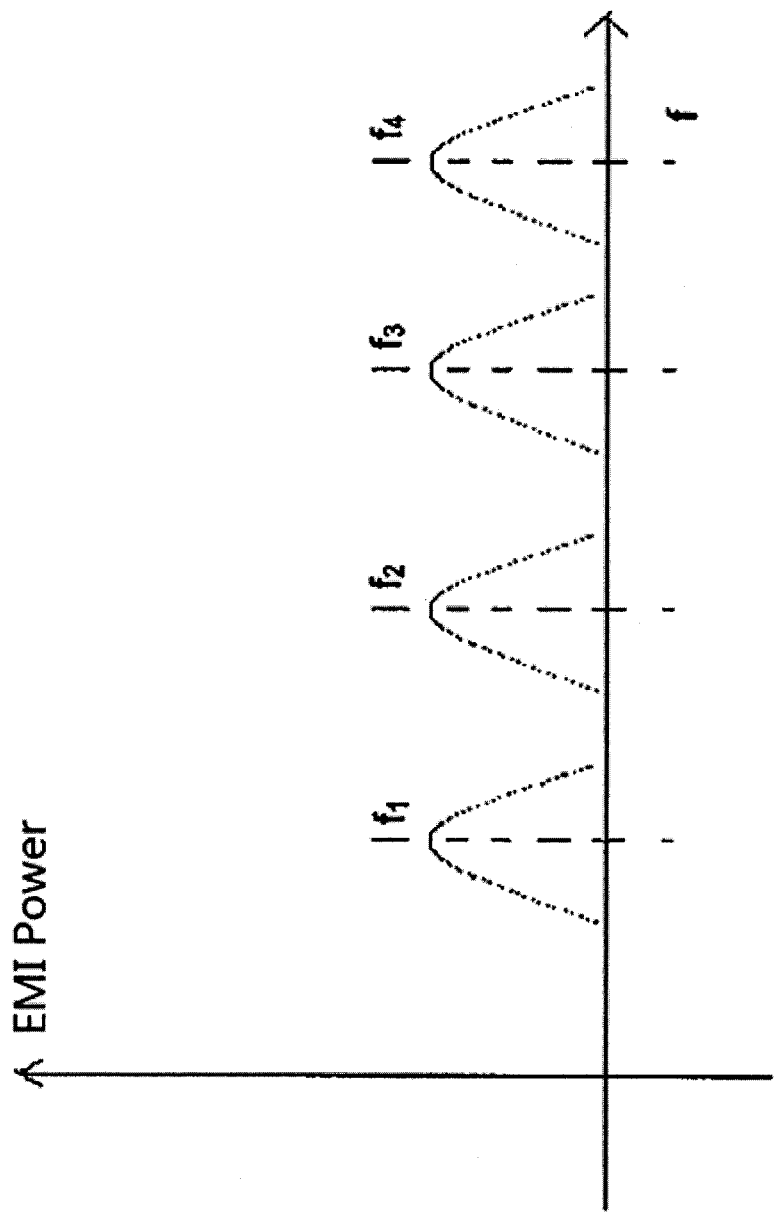
FIG. 10 illustrates a schematic diagram of frequency EMI power distribution characteristic of the fly-back AC-DC converter 10 shown in FIG. 7 according to an embodiment of the present invention.

As shown in FIG. 9, as the peak current threshold is jittering, the switch-on time of the primary switch M1 dithers with different operation cycle. Thus the peak current of the primary switch M1 also dithers with different operation cycle. To regulate the output voltage, the feedback loop regulates the off-time. Therefore the off-time is also jittering. According to such system, a diagram of the EMI power of the AC-DC converter 10 versus the primary switch frequency is shown in FIG. 10. The variation of peak current changes the on-time and the off-time of the primary switch, and each of peak current values generates a switching frequency center f1, f2, f3 or f4. The EMI power is dispersed at the frequency ranges around these frequency centers, so that the EMI power may be distributed over a relatively wide frequency range. The density of EMI power is thus greatly reduced and the EMI performance is improved significantly.

Specially, as described above, in certain embodiments, the first jittering signal (jittering reference voltage) from the jittering signal generator (time-varying voltage source 13) may relate to white noise and dither randomly. For this occasion, more switching frequency centers f1-fn may be formed and better EMI performance may be achieved.

It should be noted that the average operation frequency of the switch is the average value of the frequency of the switch control signal. In one embodiment, the average operation frequency approximately equals to the average value of the switching frequency centers f1, f2, f3 and f4.

Figure 11:
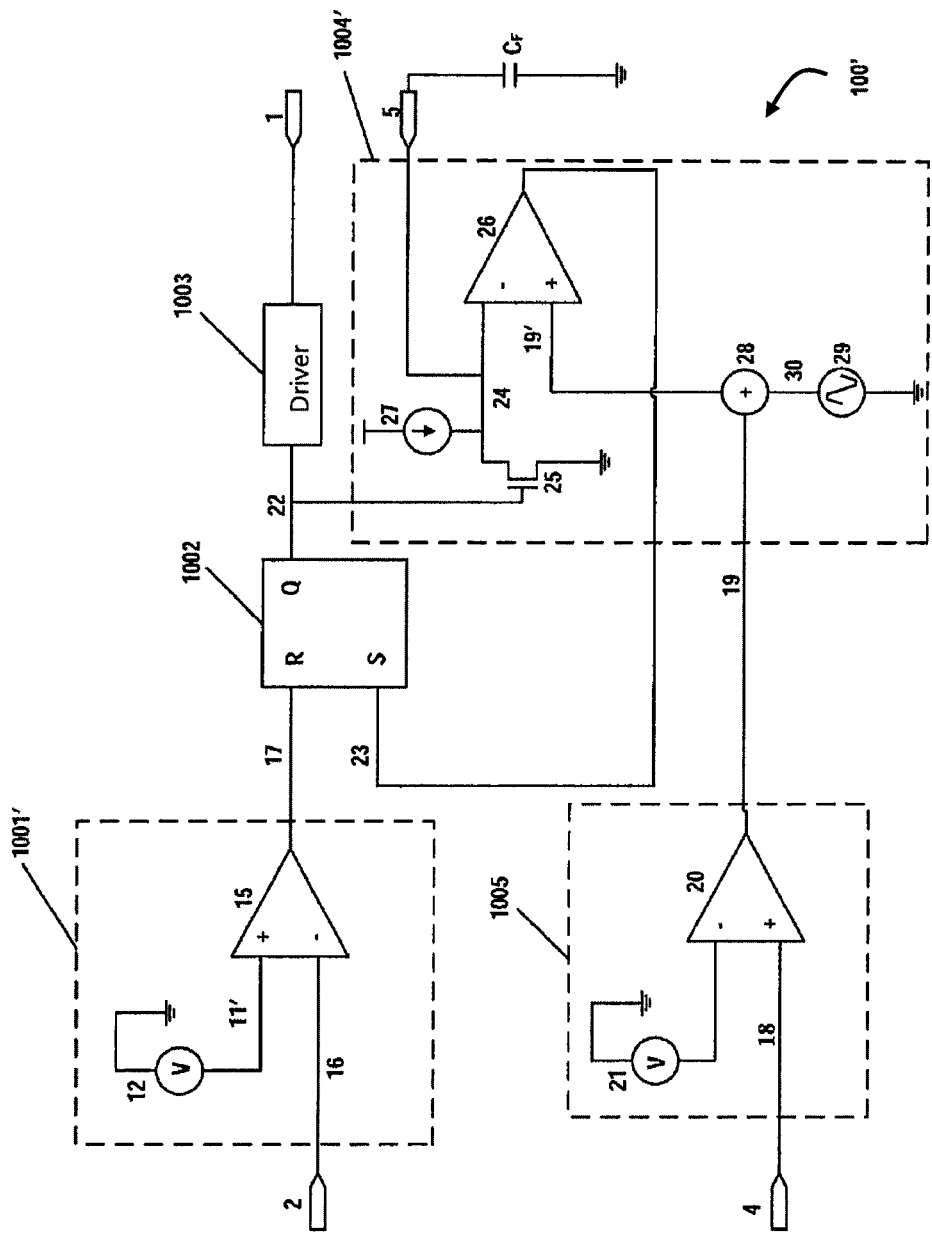
FIG. 11 illustrates another switch-mode power supply controller 100' applied in fly-back AC-DC converter 10 shown in FIG. 7 according to another embodiment of the present invention.

FIG. 11 illustrates another switch-mode power supply controller 100'. Same as controller 100, the controller 100' also has pin 1 to pin7. The difference between the controller 100 and 100' is described in the following text.

One with ordinary skill in relevant art should understand that the pin number and function distribution are only for illustration. In other embodiments, more or less pins with different function may be applied, or the specific function distribution may be different from the controller 100. The controller 100' may also comprise some pins which are only for satisfying the packaging standard.

Similarly to FIG. 8, it should be noted that in FIG. 11, not all functional components are depicted. For example, the ground pin 3, power supply Vcc pin6 and high level input voltage pin 7 in FIG. 7 are not shown in FIG. 11. However, it does not indicate that these pins and their associated coupled function components are not existed in controller 100'. Specially, one with ordinary skill in relevant art should understand that in certain embodiments, a power management module may be coupled between power supply Vcc pin 6 and the ground pin 3, configured to provide power and reference voltages to the functional components in controller 100'. Furthermore, one with ordinary skill in relevant art may understand in other embodiments, an initiation apparatus may be coupled between the high level input voltage pin 7 and the ground pin 3, configured to provide power and reference voltages to the functional components in controller 100'.

As shown in FIG. 11, the primary difference between the controller 100 and 100' is that an alternative off-time controller 1004' is utilized to substitute the off-time controller 1004. Compared with the off-time controller 1004, off-time controller 1004' further comprises a jittering signal generator. In one embodiment, the jittering signal generator may be a time-varying voltage source 29. An adder 28 couples a jittering voltage signal 30 (also referred as the first jittering voltage signal hereby and in the following text) generated from the time-varying voltage source 29 into the received feedback error signal 19, so that a jittering feedback error signal 19' is formed. The jittering feedback error signal 19' is provided to the positive input end of the comparator 26.

In one embodiment, the first jittering voltage signal 30 from the time-varying voltage source 29 dithers periodically, wherein the cycle of the jittering voltage signal 30 may different from the average operational cycle of the primary switch M1. In one embodiment, the cycle of the jittering voltage signal 30 may be larger than the average operational cycle of the primary switch M1. In another embodiment, the jittering amplitude of the jittering voltage signal 30 is smaller than the average amplitude of the jittering feedback error signal 19'. In one embodiment, the jittering voltage signal 30 may be a sine wave signal or a triangle signal. One with ordinary skill in relevant art should understand that other suitable wave forms may be applied in jittering voltage signal 30.

In some embodiments, the jittering voltage from time-varying voltage source 29 may dither randomly. For example, in one embodiment, a noise voltage source may be applied directly or indirectly as the time-varying voltage source 29. In another embodiment, the noise voltage from the noise voltage source are further filtered before being applied, so that only a specified frequency range of noise voltage components are remained.

When the output Q end output 22 of the RS flip-flop is at high level (logic 1), the NMOS 25 is on and through NMOS 25, the current of the current source 27 flows to the reference ground. By utilizing an NMOS with a relatively large gate length (with low on-state resistance and low voltage drop), the voltage level of node 24 is relatively low or substantially near zero. The output 23 of the comparator 26 is at high level.

When the Q end output 22 of the RS flip-flop 1002 flops from high level (logic 1) to low level (login 0), NMOS 25 is cut off. The current of current source 27 charges the frequency capacitor Cf through the frequency setting pin 5. When the voltage across the frequency capacitor Cf increases to the jittering feedback error signal generator 19', the output 23 of comparator 26 flops from high level to low level, and thus the Q end output 22 of the RS flip-flop 1002 is reset to high level. The NMOS 25 turn on again to release to the charges on frequency capacitor Cf. Correspondingly, the voltage on node 24 returns to low level and the output 23 of the comparator 26 returns to high level.

One with ordinary skill in relevant art should understand that current source 27, comparator 26 and the frequency capacitor Cf comprise a timer. When the Q end signal 22 of RS flip-flop 1002 flops from high level (logic 1) to low level (logic 0), this timer is triggered. After a predetermined period, the voltage across the frequency capacitor Cf reaches the jittering feedback error signal 19', and the output 23 of comparator 26 turns from high level to low level to generate timing over signal. One with ordinary skill in relevant art should understand that besides the current of current source 27 and the capacitance of the frequency capacitor Cf, the predetermined period also depends on the amplitude of jittering feedback error signal 19'.

In above description, the off-time controller 1004' is coupled to an external frequency capacitor Cf through the frequency setting pin 5 of the controller 100'. However, one with ordinary skill in relevant art should understand in other embodiments, the off-time controller 1004' may alternatively comprise an internal frequency capacitor coupled with node 24. For this occasion, the frequency setting pin 5 and the external frequency capacitor Cf may be omitted.

Moreover, in controller 100', an on-time controller 1001' is applied instead of on-time controller 1001. The primary difference between on-time controller 1001' and 1001 is that the peak current threshold voltage 11' is provided by constant reference voltage source 12 only. Thus the progress of EMI performance for controller 100' is primarily because the adder 28 couples the jittering voltage signal 30 generated from the time-varying voltage source 29 into feedback error signal 19. However, one with ordinary skill in relevant art should understand that in certain embodiments, it is possible to utilize on-time controller 100 into switch-mode power supply controller 1001.

Figure 12:
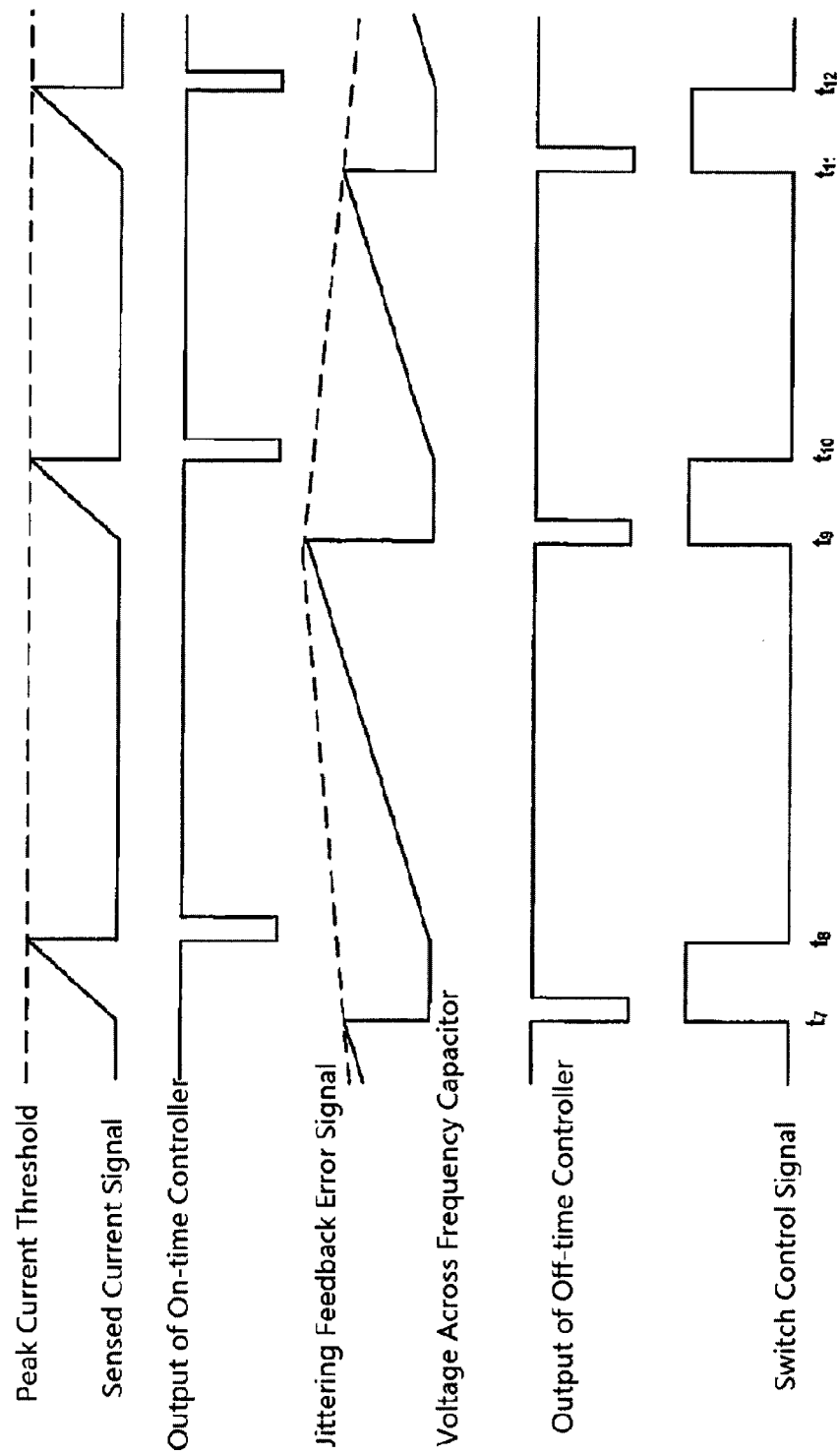
FIG. 12 illustrates an operational wave forms diagram of the fly-back AC-DC converter 10 applying the controller 100' shown in FIG. 11 according to another embodiment of the present invention.

FIG. 12 illustrates a wave form diagram of the operation process of fly-back AC-DC converter 10 applying switch-mode power supply controller 100'.

Similar to FIG. 9, from top to bottom, FIG. 12 illustrates when the fly-back AC-DC converter 10 is in stable operation condition, the wave forms of peak current threshold voltage 11', sensed current signal 16', the output of on-time controller 1001' (the input signal at the reset end of RS flip-flop 1002), the jittering feedback error signal 19'(with a triangle wave dither), the voltage across frequency capacitor Cf, the output of off-time controller 1004', and the switch control signal 22. One with ordinary skill in relevant art should understand that these wave forms are illustrative but not scaled. Different signals may be illustrated with different amplify magnification factors and some parts of certain signal may be amplified or shrunk.

Different from the wave forms in FIG. 9, in FIG. 12, firstly, the peak current threshold voltage 11' is constant, and thus the on-time of the primary switch M1 and the peak current are constant. Secondly, in off-time controller 1004', the voltage across frequency capacitor Cf is compared with the jittering error feedback signal 19', so that the off-time of the primary switch M1 varies from cycle to cycle.

Figure 13:
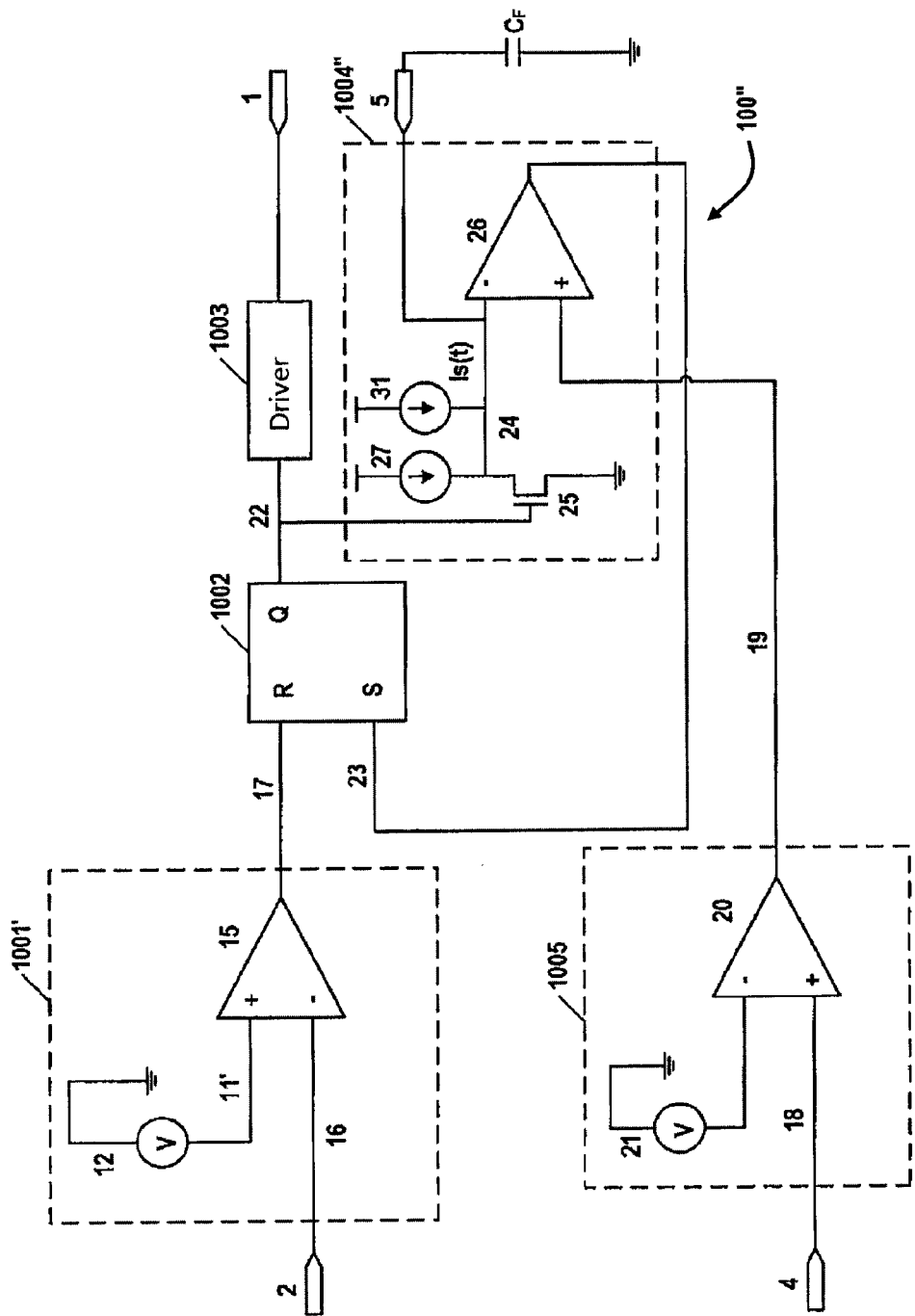
FIG. 13 illustrates yet another switch-mode power supply controller 100" applied in fly-back AC-DC converter 10 shown in FIG. 7 according to yet another embodiment of the present invention.

FIG. 13 illustrates yet another switch-mode power supply controller 100" according to yet another embodiment of the present invention. In the illustrated embodiment, the controller 100" has pin 1 to pin 7 the same as controller 100. The primary difference between controller 100" and 100 is described in the following text.

One with ordinary skill in relevant art should understand that the pin number and function distribution are only for illustration. In other embodiments, more or less pins with different function may be applied, or the specific function distribution may be different from the controller 100'. The controller 100" may also comprise some pins which are only for satisfying the packaging standard.

Similarly to FIG. 8 and FIG. 11, it should be noted that in FIG. 13, not all functional components are depicted. For example, the ground pin 3, power supply Vcc pin6 and high level input voltage pin 7 in FIG. 7 are not shown in FIG. 13. However, it does not indicate that these pins and their associated coupled function components are not existed in controller 100'. Specially, one with ordinary skill in relevant art should understand that in certain embodiments, a power management module may be coupled between power supply Vcc pin 6 and the ground pin 3, configured to provide power and reference voltages to the functional components in controller 100". Furthermore, one with ordinary skill in relevant art may understand in other embodiments, an initiation apparatus may be coupled between the high level input voltage pin 7 and the ground pin 3, configured to provide power and reference voltages to the functional components in controller 100".

The primary difference between switch-mode power supply controllers 100' and 100" is that an off-time controller 1004" is applied instead of off-time controller 1004'. The off-time controller 1004" does not add jitter to the feedback error signal 19. Therefore adder 28 and time-varying voltage source 29 are omitted from off-time controller 1004". The feedback error signal 19 is directly provided to the positive input end of comparator 26. Furthermore, as shown in FIG. 13, besides current source 27 which generates a constant current, the off-time controller 1004' further comprises a time-varying current source 31 (also referred as the jittering signal generator) which generates a time-varying current Is(t). One end of time-varying current source 31 may be coupled to the power supply voltage Vcc, and the other end may be coupled to node 24.

One with ordinary skill in relevant art should understand that in off-time controller 1004", current source 27 and time-varying current source 31 together comprise a global time-varying current source. One with ordinary skill in relevant art should further understand that in other embodiments, other suitable method may be applied to form the global time-varying current source. For example, off-time controller 1004" may comprise only a signal time-varying current source, and current source 27 is thus omitted.

In some embodiments, the current generated from the global time-varying current source may dither periodically. In one embodiment, the dithering cycle may be significantly larger than the average operation cycle of the switch M1. For an instance, the dithering cycle is twice larger than the operation cycle of the switch M1. In other embodiments, the current may vary randomly for each of a constant period. In one embodiment, the constant period is significantly larger than the average operation cycle of the switch M1, for example, twice larger than the average operation cycle. In another embodiment, the current source 27 provides a relatively larger constant current, and the time-varying current source 31 provides a relatively small time-varying current Is(t). In yet another embodiment, the time-varying current is a sine wave current, or a triangle wave current, or a square wave current, or the time-vary current jumps to one of a plurality of constant values for each of a constant period.

The other part of off-time controller 1004" may be similar to or the same as the controller 1004.

For switch-mode power supply controller 100", when the Q end output 22 of the RS flip-flop 22 is at high level, NMOS 25 turns on. The current from current source 27 and time-varying current source 31 flows to the reference ground through NMOS 25. At this time, the voltage on node 24 is remained to low level or zero by applying a large gate length NMOS device (with a low on-state resistance and low voltage drop when current flowing through). The output 23 of comparator 26 is at high level.

When the Q end output 22 of the RS flip-flop 1002 flops from high level (logic 1) to low level (logic 0), NMOS 25 is cut off. The global time-varying current generated by current source 27 and time-varying current source 31 charges the frequency capacitor Cf through the pin 5, and the voltage across the frequency capacitor Cf increases gradually. When the voltage across the Cf reaches the feedback error signal 19, the output 23 of comparator 26 flops from high level to low level, and thus the Q end output 22 of the RS flip-flop 1002 is reset to high level. The NMOS 25 turns on again to release the charges on frequency capacitor Cf. Correspondingly, the voltage on node 24 returns to low level and the output 23 of the comparator 26 returns to high level.

One with ordinary skill in relevant art should understand that in the illustrated embodiment, constant current source 27, time-varying current source 31, comparator 26, and the frequency capacitor Cf comprises a timer. When the Q end output 22 of RS flip-flop 1002 flops from high level (logic 1) to low level (logic 0), the time is triggered. After a predetermined period, the voltage across Cf reaches the feedback error signal 19, and the output 23 of comparator 26 flops from high level to low level. One with ordinary skill in relevant art should understand that as the utilization of time-varying current source 31, the speed for charging the frequency capacitor Cf may be time-varying. Therefore the off-time depends on off-time controller 1004" may also be time-varying.

One with ordinary skill in relevant art should understand that in other embodiments, an internal frequency capacitor may be applied in off-time controller 1004 to couple with node 24. Therefore the frequency set pin 5 and external frequency capacitor Cf may be omitted.

In one embodiment, the on-time controller 1001' may also be applied in switch-mode power supply controller 100". The peak current threshold 11' is provided by the constant voltage source 12. As a result, the progress of EMI performance is primarily the consequence of the global time-varying current generated from current source 27 and time-varying current source 31. By charging the frequency capacitor Cf, a uttering signal is added into the off-time decided by the off-time controller 1004". One with ordinary skill in relevant art should further understand that on-time controller 1001 may also be utilized in switch-mode power supply controller 100".

FIG. 14 illustrates a wave form of operation process of fly-back AC-DC converter 10 with switch-mode power supply controller 100".

Similar to FIG. 9 and FIG. 12, from top to bottom, FIG. 14 illustrates when the fly-back AC-DC converter 10 is in stable operation condition, the wave forms of peak current threshold signal 11', sensed current signal 16, the output of on-time controller 1001' (the input signal at the reset end of RS flip-flop 1002), the time-varying current Is(t) generated from time-varying current source 31, the feedback error signal 19, the voltage across frequency capacitor Cf, the output of off-time controller 1004", and the switch control signal (the Q end output of RS flip-flop 1002). One with ordinary skill in relevant art should understand that these wave forms are illustrative but not scaled. Different signals may be illustrated with different amplify magnification factors and some parts of certain signal may be amplified or shrunk.

Different from the wave forms in FIG. 9, in FIG. 14, firstly the peak current threshold voltage 11' is constant, and thus the on-time of the switch M1 and the peak current are also constant. Secondly, as the time-varying current Is(t) steps at a moment t13 as shown at the label "C" in FIG. 14, the charging current also steps at the moment t13. Therefore the changing gradient of the voltage across frequency capacitor Cf is changed at the moment t13, as labeled with "A" and "B". Therefore, the dither is added into the off-time. For example, seen in FIG. 14, because of the different changing gradient of the voltage across Cf, the off-time between moments t17 and t18 (at a second cycle) is different from the off-time between moments t15 and t16 (at a first cycle).

We claim:

1. A switch-mode power supply controller configured to generate a switch control signal to drive a primary switch, the switch-mode power supply controller comprising:
    an on-time controller, receiving a sensed signal indicative of a current on the primary switch, and generating a switch-off signal, wherein the switch-off signal is configured to switch OFF the primary switch when the sensed signal arrives at the same level as a threshold signal indicative of a peak current, and wherein the switch-off signal is utilized to determine an on-time of the primary switch;
    an off-time controller, receiving a feedback error signal and the switch control signal, and generating a switch-on signal configured to switch ON the primary switch, wherein the switch-on signal is utilized to determine an off-time of the primary switch;
    a switch control signal generator, receiving the switch-off signal and the switch-on signal, operable to generate the switch control signal; and
    a jittering signal generator, generating a first jittering signal, wherein the jittering signal generator is coupled to either the on-time controller or the off-time controller, and wherein the first jittering signal is utilized to jitter the on-time or the off-time of the primary switch;
    wherein the off-time controller further comprises a frequency capacitor, a comparator and a constant current source, wherein a charging current charges the frequency capacitor when the switch control signal is set to turn the primary switch OFF, and wherein the comparator is configured to switch ON the primary switch when the voltage level across the frequency capacitor arrives at the level of the feedback error signal, and further wherein the constant current source is configured to generate a constant current, wherein the charging current comprises the constant current.

2. The switch-mode power supply controller according to claim 1, wherein the first jittering signal dithers periodically, and wherein a cycle of the first jittering signal is different from an average operation cycle of the primary switch.

3. The switch-mode power supply controller according claim 1, wherein the first jittering signal dithers randomly, and wherein the dithering of the first jittering signal depends on white noise.

4. The switch-mode power supply controller according to claim 1, wherein the first jittering signal is a sine wave signal.

5. The switch-mode power supply controller according to claim 1, wherein the first jittering signal is a triangle wave signal.

6. The switch-mode power supply controller according to claim 1, wherein the sensed signal, the threshold signal, the feedback error signal and the first jittering signal are voltage signals, and wherein the jittering signal generator is a time-varying voltage source.

7. The switch-mode power supply controller according to claim 6, wherein the first jittering signal is coupled to the threshold to dither the threshold signal and to influence the on-time of the primary switch.

8. The switch-mode power supply controller according to claim 7, wherein the on-time controller further comprises a first reference voltage source to generate a constant reference voltage, wherein the constant reference voltage and the first jittering signal are coupled together to comprise the threshold signal.

9. The switch-mode power supply controller according to claim 1, wherein the first jittering signal is a current signal, and wherein the jittering signal generator is a time-varying current source.

10. A method for controlling a switch-mode power supply, comprising:
    generating a switch-off signal by an on-time generator to determine an on-time of a primary switch when the level of a sensed signal indicative of a current on the primary switch is larger than the level of a threshold signal indicative of a peak current;
    generating a switch-on signal by an off-time generator to determine an off-time of the primary switch, wherein the off-time depends on a feedback error signal;
    coupling a jitter signal to either the on-time generator or the off-time generator to dither the on-time or the off-time through a first jittering signal; and
    generating a switch control signal according to the switch-off signal and the switch-on signal;
    wherein generating the switch-on signal comprising:
    charging a frequency capacitor with the charging current initiating from the moment when the switch control signal is set to turn the primary switch OFF; and
    generating a switch-on signal when the voltage level across the frequency capacitor arrives at the level of the feedback error signal.

11. The method for controlling the switch-mode power supply according to claim 10, wherein the first jittering signal dithers periodically, and wherein the cycle of the first jittering signal is larger than the average operation cycle of the primary switch.

12. The method for controlling the switch-mode power supply according to claim 11, wherein the first jittering signal is a sine wave signal.

13. The method for controlling the switch-mode power supply according to claim 11, wherein the first jittering signal is a triangle wave signal.

14. The method for controlling the switch-mode power supply according to claim 10, wherein coupling jitter to the on-time generator comprises coupling the first jittering signal to the threshold signal.

* * * * *